O. C. SHAW.

THRESHING MACHINE CYLINDER.

APPLICATION FILED AUG. 19, 1912.

Reissued Oct. 15, 1912. 13,479.

Witnesses;
L. B. Worner,
J. H. Swan, Jr.

Inventor
Orpheus C. Shaw,
By Minturn & Worner
Attorneys

UNITED STATES PATENT OFFICE.

ORPHEUS C. SHAW, OF SPOKANE, WASHINGTON, ASSIGNOR TO SECTIONAL THRESHING CYLINDER CO., OF SPOKANE, WASHINGTON, A CORPORATION.

THRESHING-MACHINE CYLINDER.

13,479. Specification of Reissued Letters Patent. Reissued Oct. 15, 1912.

Original No. 1,011,379, dated December 12, 1911, Serial No. 596,291. Application for reissue filed August 19, 1912. Serial No. 715,942.

*To all whom it may concern:*

Be it known that I, ORPHEUS C. SHAW, a citizen of the United States, residing at Spokane, in the county of Spokane and State of Washington, have invented certain new and useful Improvements in Threshing-Machine Cylinders; and I do hereby declare the following to be a full, clear, and exact description of the invention, such as will enable others skilled in the art to which it appertains to make and use the same.

This invention relates to improvements in threshing machine cylinders, and the like, and particularly to the construction and arrangement of the head of the cylinders, together with means for holding the teeth supporting bars thereto.

The object in view is the provision of a threshing machine cylinder with an improved socket device designed to fit into the heads of the cylinder and retain therein the bars carrying the teeth for permitting a quick and ready removal at any time.

A further object of the invention is the arrangement of heads for threshing machine cylinders having segmental sockets therein for receiving socket members of substantially the same shape, which hold in place the teeth carrying bars of the cylinder, and are in turn prevented from removal by a spring held pin which may be removed manually for removing any of the bars whenever desired.

With these and other objects in view the invention comprises certain novel constructions, combinations, and arrangement of parts, as will be hereinafter more fully described and claimed.

Figure 1:
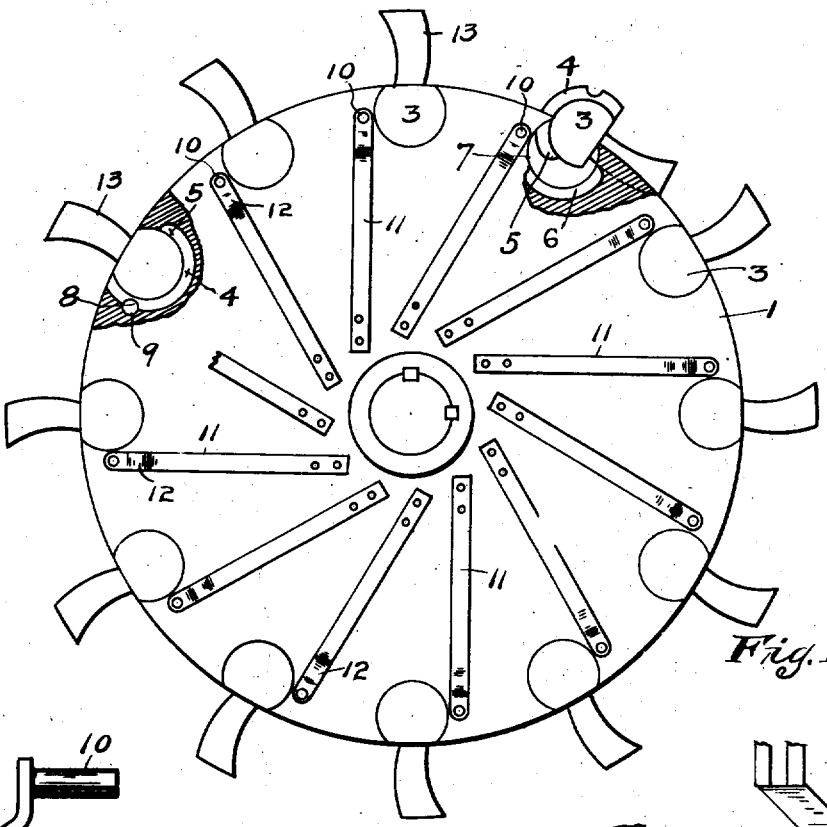
Figure 2:
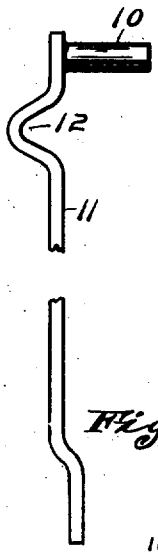
Figure 3:
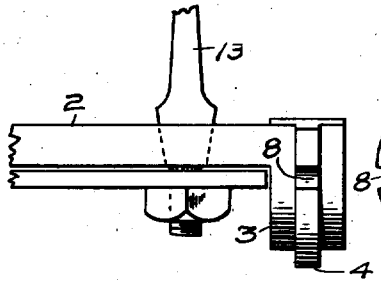
Figure 4:
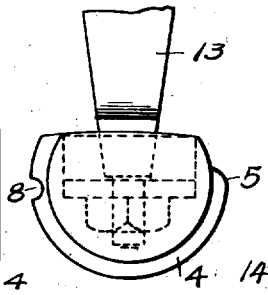
Figure 5:
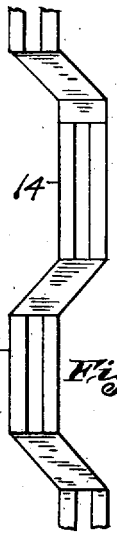
Figure 6:
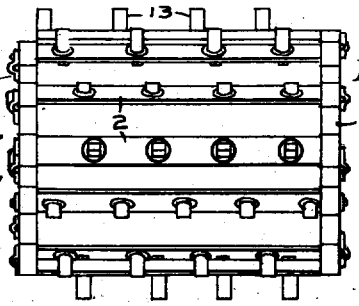

In the accompanying drawings; Figure 1 is an end view of a cylinder embodying the invention, certain parts being broken away to better disclose the structure. Fig. 2 is a side view of a pin and spring embodying certain features of the invention. Fig. 3 is a fragmentary side view of one of the teeth supporting bars and associated parts. Fig. 4 is an end view of the structure shown in Fig. 3. Fig. 5 is a fragmentary edge view of a slightly modified form of one of the cylinder heads. Fig. 6 is a side view of a cylinder embodying the invention, the same being shown on a reduced scale.

In constructing a threshing machine cylinder embodying the invention the same may be of any desired size and design having a pair of heads or end members and a plurality of teeth carrying cross-bars connected with the head or end members. Each of the teeth carrying bars is provided with enlarged ends having a dependent annular fin extending for slightly less than the entire distance around the end members for fitting into grooves merging into sockets which are formed in the heads for receiving the end members. The annular fin is provided with a notch corresponding with a notch in the head for forming an aperture designed to receive a retaining pin held in place by a suitable spring, which pin normally retains the end members in the heads, and consequently prevents any accidental removal or movement of the cross-bars independent of the heads.

In order that the invention may be more clearly understood an embodiment of the same is shown in the accompanying drawings, in which 1 indicates the heads of a threshing machine cylinder, and 2 a cross-bar. The cross-bars 2 are provided with enlargements 3 at each end. The enlargements 3 are provided with an annular flange 4 which stops at point 5 on one side of the enlargements, but extends on the other side to the top of the enlargements, so as to come flush with the periphery of the head 1 when in place. The flange 4 fits into a groove 6 in the cylinder head 1, and the remaining part of the enlargement 3 fits in a socket 7 so that when the enlargement is in proper place the upper surface will be flush with the periphery of the cylinder head 1, and offer no obstruction. Each flange or fin 4 is provided with a notch or groove 8 mating with a small notch or groove 9 formed in the head 1 for accommodating a pin 10. The pin 10 acts as a retaining pin for holding the enlargement from removal, and is in turn held in place by a spring 11 rigidly secured to the head 1, but the pin is permitted free movement for entering and passing out of the aperture formed by notches or grooves 8 and 9. A bowed out portion 12 in spring 11 is provided for permitting a substantially universal movement of pin 10 in order to permit the easy insertion and removal thereof whenever desired. Bar 2 has secured thereto any desired number of teeth 13, which may be of any desired kind. Also as many bars 2 may be used as desired, and preferably the same are arranged so that the teeth 13 thereof are staggered so that some of the teeth will be able to operate at the extreme end of the cylinder. In order to permit this last operation the heads 1 may be made as shown in Fig. 5 having lugs or projections 14 formed thereon for receiving enlargements 3. In arranging the bars 2 the same are preferably made the same length and the lugs 14 on the opposite heads 1 are arranged so that when the lugs 14 on one head project outward from the cylinder the lugs 14 on the opposite head will project inward. This will permit the use of bars 2 of the same length, and yet provide a staggered arrangement of the teeth 13.

It will be observed that by the arrangement of the fin or flange 4 with the ends stopping at point 5 that the enlargements 3 may be inserted, as shown in Fig. 1, or may be removed. It also will be noted that this structure permits the rotation of the enlargements and the consequent rotation of bars 2 until teeth 13 are properly in position extending in a radial line from the center of the cylinder. Any further movement in this direction is prevented, and any reverse movement is prevented by pin 10, so that the bars 2 are rigidly held properly in position, but by means which may be instantly operated for removing any individual bar without affecting the remaining bars.

What I claim is:

1. A cylinder comprising opposite heads having segmental recesses formed in the periphery of the heads greater than a semicircle, said recesses being each provided with a groove, a segmental member proportioned to fit each of said recesses and provided with a tongue proportioned to fit the groove, and a covered stop means below the periphery of the heads at the forward sides of said recesses to retain the segmental members.

2. A cylinder comprising opposite heads having segmental recesses formed in the periphery of the heads greater than a semicircle, said recesses being each provided with a groove, a segmental member proportioned to fit each of said recesses and provided with a tongue proportioned to fit the groove, and a stop means comprising an integral part of the segmental member and an integral part of the head with which it contacts, to retain the segmental member and by which said stop is covered.

3. A cylinder comprising opposite heads having segmental recesses formed in the periphery of the heads greater than a semicircle, said recesses being each provided with a groove terminating short of the forward side of said recesses, a segmental member proportioned to fit each of said recesses and provided with a tongue proportioned to fit the groove and to form an abutment at the shoulder formed by the termination of the groove.

4. A cylinder comprising opposite heads having segmental recesses formed in the periphery of the heads greater than a semicircle, said recesses being each provided with a groove terminating short of the forward side of said recesses, a segmental member proportioned to fit each of said recesses and provided with a tongue proportioned to fit the groove and to form an abutment at the shoulder formed by the termination of the groove, and means to lock the segmental members in their heads.

5. A cylinder comprising opposite heads having segmental recesses formed in the periphery of the heads greater than a semicircle, said recesses being each provided with a groove terminating short of the forward side of said recesses, a segmental member proportioned to fit each of said recesses and provided with a tongue proportioned to fit the groove and to form an abutment at the shoulder formed by the termination of the groove, and pins to lock the segmental members in their heads.

6. A cylinder comprising opposite heads having segmental recesses formed in the periphery of the heads greater than a semicircle, said recesses being each provided with a groove terminating short of the forward side of said recesses, a segmental member proportioned to fit each of said recesses and provided with a tongue proportioned to fit the groove and to form an abutment at the shoulder formed by the termination of the groove, a pin positioned to be inserted through the tongue and the adjacent walls of the groove and a resilient member for holding the pin yieldingly in position.

7. A cylinder comprising opposite heads having lugs projecting laterally on alternate opposite sides and having recesses formed in said lugs, and toothed cross-bars having ends to fit into said recesses.

8. A cylinder comprising opposite heads having lugs projecting laterally on alternate opposite sides and having segmental recesses formed in the periphery of the heads greater than a semicircle, said recesses being each provided with a groove terminating short of the forward side of said recesses and toothed cross-bars connecting the heads and having segmental members proportioned to fit the respective recesses, said segmental members being each provided with a tongue proportioned to fit the groove and form an abutment at the shoulder formed by the termination of the groove.

In witness whereof, I, have hereunto set my hand and seal at Indianapolis, Indiana, this 14th day of August, 1912.

ORPHEUS C. SHAW. [L. S.]

Witnesses:

HENRY S. SCHOPF,

J. A. MINTURN.

Copies of this patent may be obtained for five cents each, by addressing the "Commissioner of Patents. Washington, D. C."